United States Patent [19]

Kim

[11] Patent Number: 5,629,738

[45] Date of Patent: May 13, 1997

[54] APPARATUS FOR GENERATING A DETECTION CLOCK FOR DETECTING DIGITAL DATA CONTAINED IN A COMPOSITE VIDEO SIGNAL AND A DATA DETECTOR USING DETECTION CLOCK

[75] Inventor: Hak-sung Kim, Suwon, Rep. of Korea

[73] Assignee: Samsung Electronics Co., Ltd., Kyungki-do, Rep. of Korea

[21] Appl. No.: 480,327

[22] Filed: Jun. 7, 1995

[30] Foreign Application Priority Data

Jun. 10, 1994 [KR] Rep. of Korea .................. 94-13097

[51] Int. Cl.$^6$ .................................................. H04N 7/087
[52] U.S. Cl. ........................................ 348/465; 348/468
[58] Field of Search ................................. 348/465, 468, 348/478, 537; H04N 7/087

[56] References Cited

U.S. PATENT DOCUMENTS 5,506,626  4/1996  Yagi et al. .................. 348/468

FOREIGN PATENT DOCUMENTS 2225519   5/1990   United Kingdom ........... H04N 7/087
92022171  12/1992  WIPO ............................ H04N 7/087

*Primary Examiner*—Victor R. Kostak
*Attorney, Agent, or Firm*—Sughrue, Mion, Zinn, Macpeak & Seas

[57] ABSTRACT

A detection clock generating apparatus generates a detection clock signal for detecting digital data contained in the vertical blanking period of a received composite video signal. A slicer generates a slicing reference signal based on the analog clock run-in signal and slices the received analog clock run-in signal by using the generated slicing reference signal. A synchronizing portion synchronizes the sliced data with an internal clock signal. An edge detecting portion detects the rising edges of pulses of the synchronized sliced data and outputs an edge detection signal. A clock generator generates a detection clock signal on based on the pulses of the edge detection signal.

20 Claims, 4 Drawing Sheets

FIG. 1
(PRIOR ART)
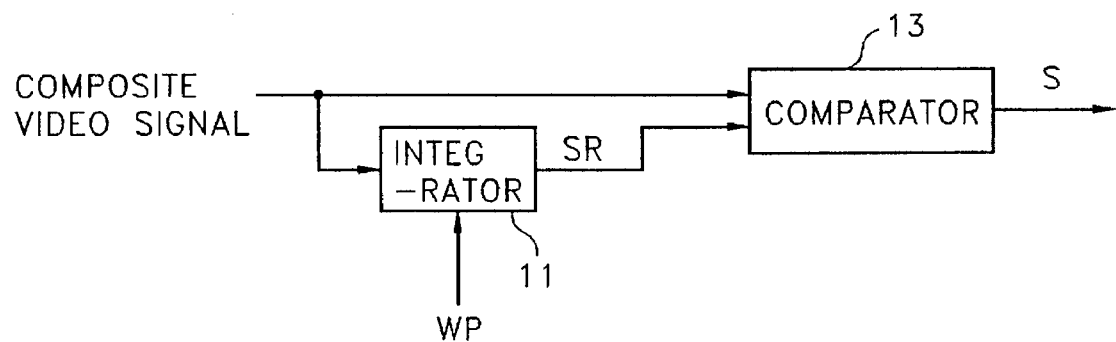
FIG. 3A
FIG. 3B
FIG. 3C
FIG. 3D
FIG. 3E

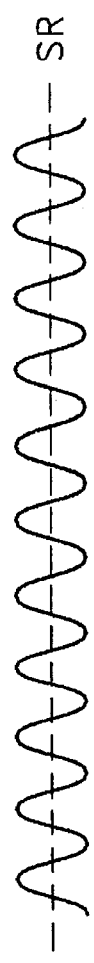
FIG. 2A COMPOSITE VIDEO SIGNAL
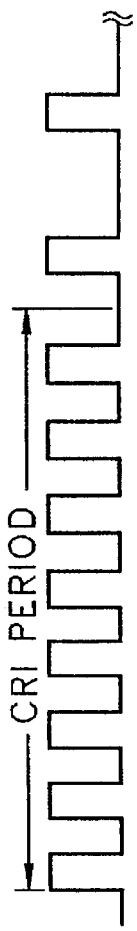
FIG. 2B WP
FIG. 2C
FIG. 2D SR

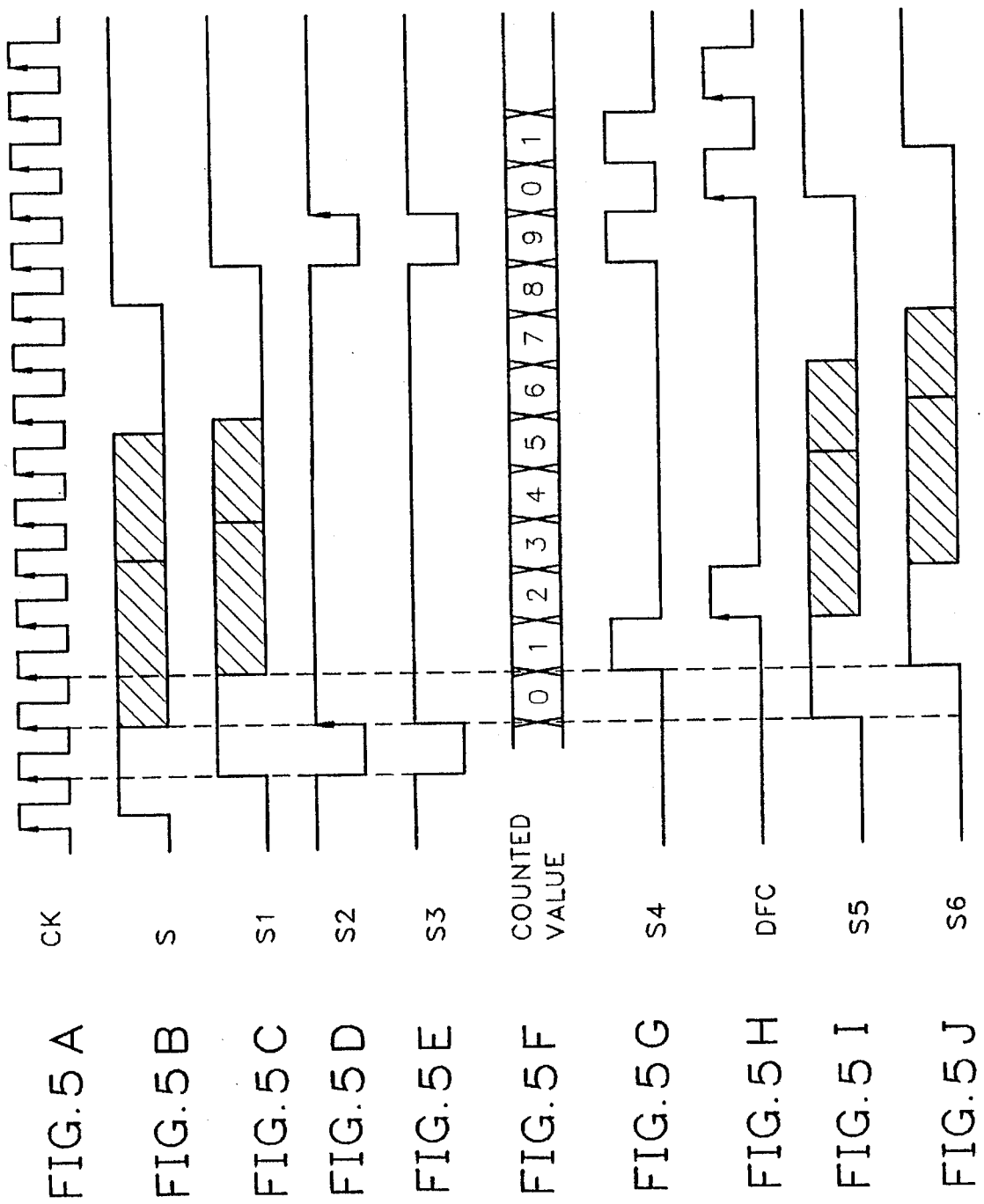

APPARATUS FOR GENERATING A DETECTION CLOCK FOR DETECTING DIGITAL DATA CONTAINED IN A COMPOSITE VIDEO SIGNAL AND A DATA DETECTOR USING DETECTION CLOCK

BACKGROUND OF THE INVENTION

The present invention relates to the detection of digital data contained in a composite video signal. More particularly, the invention relates to an apparatus for generating a detection clock signal for detecting digital data contained in the vertical blanking period of the composite video signal. Furthermore, the invention relates to a digital data detector which uses the detection clock signal.

In a character multi-broadcasting system, data corresponding to characters or figures are digitally encoded and inserted into the vertical blanking period of a composite video signal. Examples of such systems are a teletext system, the Korea Broadcasting Program Service (KBPS), and a caption system. The location of the encoded digital data within in the composite video signal is determined based on a sync signal (e.g. a clock run-in (CRI) signal) which precedes the data.

The digital data is extracted from the vertical blanking signal via a slicer. As illustrated in FIG. 1, a conventional slicer comprises an integrator 11 and a comparator 13. The integrator 11 inputs a CRI signal contained in the analog composite video signal and produces a slicing reference signal SR based on the CRI signal. The CRI signal is easily detected by the integrator 11 because it has a predetermined bit pattern. For instance, the CRI signal may comprise the 16 bit pattern "1010 1010 1010 1010".

The operation of the integrator 11 will be described below in conjunction with the waveform diagrams illustrated in FIGS. 2A to 2D. First, the integrator 11 inputs the composite video signal shown in FIG. 2A and a window pulse signal WP illustrated in FIG. 2C. Then, the integrator 11 integrates and averages the portion of the CRI signal which is input during a period that the window pulse signal WP is HIGH. Afterwards, the integrator 11 generates a slicing reference signal SR in accordance with the averaged value of the CRI signal.

As shown in FIGS. 2B and 2C, the window pulse signal WP goes HIGH during part of the period of the CRI signal. Preferably, the window pulse signal WP should be HIGH for a period greater than or equal to the period of three pulses of the CRI signal in order to precisely determine the slicing reference signal SR.

The slicing reference signal is illustrated in FIG. 2D. In the figure, the hatched portion indicates the period during the window pulse signal WP that the integrator 11 cannot determine the value of the slicing reference signal SR. Subsequently, when the reference signal SR is determined by the integrator 11, the reference signal SR is output to the comparator 13.

The comparator 13 also inputs the composite video signal and generates the sliced data S in accordance with the slicing reference signal SR. Specifically, the comparator 13 outputs the sliced data S when the analog composite video signal becomes greater than slicing reference signal SR. For example, as shown in FIG. 2A, the value of the reference signal SR is represented by the dotted line, and the comparator 13 outputs a HIGH signal as the sliced data S when the value of the analog composite video signal is greater than the reference signal SR and outputs a LOW pulse when the value of the analog composite video signal is lower than slicing reference signal SR.

FIGS. 3A to 3E illustrate the difference between a case in which the digital data is encoded in an ideal undistorted signal and a case in which the digital data is encoded in distorted signal. Specifically, FIG. 3A shows a composite video signal which does not contain a ghost and is not effected by noise. On the other hand, FIG. 3B shows a composite video signal which contains a ghost or is effected by noise. The position at which the digital data contained within the composite video signal is detected is shown in FIG. 3E.

In a conventional system, the position at which the data is detected is determined by clock signals generated in the receiver, and the clock signals are based on the duty cycle of the CRI signal contained in the composite video signal. Accordingly, when the ideal undistorted signal shown in FIG. 3A is input to the receiver, the comparator 13 outputs sliced data S having the waveform illustrated in FIG. 3C. Thus, the digital data reproduced by the receiver corresponds exactly to the original digital data transmitted in the video signal.

However, the transmitted television signal usually contains a ghost or other noise due to the characteristics of the multichannel broadcasting system. Accordingly, when the signal shown in FIG. 3A is transmitted, the receiver receives the distorted signal illustrated in FIG. 3B. Since the slicing reference signal SR is generated based on the CRI signal contained within the received signal, the waveform of the slicing reference signal SR is likewise distorted. Therefore, the comparator 13 erroneously outputs the sliced data S. For instance, the sliced data S may have a pulse width shown in FIG. 3D. As a result, since the receiver detects the digital data at the positions illustrated in FIG. 3E, the original data transmitted in the composite video signal cannot be precisely detected.

SUMMARY OF THE INVENTION

In order to overcome the problems discussed above, it is one object of the present invention to provide an apparatus for generating a detection clock signal for precisely detecting digital data contained in a received composite video signal by relying on the fact that the frequency of the composite video signal is constant even when it is distorted on the transmission channel.

It is another object of the present invention to provide an apparatus for detecting digital data contained in the vertical blanking period of the received composite video signal by using the detection clock signal generated by the detection clock generator.

To accomplish the one of the objects of the present invention, there is provided an apparatus for generating a detection clock signal for detecting digital data contained in a vertical blanking period of a received composite video signal based on an analog clock run-in signal which has a constant frequency and which is contained in the vertical blanking period of the received composite video signal, the apparatus comprising:

a slicer for generating a slicing reference signal based on the analog clock run-in signal, for slicing the analog clock run-in signal by using the slicing reference signal, and for outputting sliced data according to the slicing of the analog clock run-in signal;

a synchronizing portion for receiving the sliced data from the slicer, wherein the synchronizing portion synchronizes the sliced data with an internal clock signal to produce synchronized sliced data and wherein the internal clock signal has a frequency higher than a frequency of the analog clock run-in signal;

an edge detecting portion for receiving the synchronized sliced data, for detecting rising edges of pulses of the synchronized sliced data, and for outputting an edge detection signal which comprises pulses that respectively correspond to the rising edges; and a clock generator for receiving the edge detection signal from the edge detecting portion and for generating a detection clock signal based on the pulses of the edge detection signal.

To accomplish another object of the present invention, there is provided an apparatus for detecting digital data contained in a vertical blanking period of a received composite video signal based on an analog clock run-in signal which has a constant frequency and which is contained in the vertical blanking period of the received composite video signal, the apparatus comprising:

a slicer for generating a slicing reference signal based on the analog clock run-in signal, for slicing the analog clock run-in signal and subsequently slicing a digitally encoded signal by using the slicing reference signal, and for outputting sliced data according to the slicing of the analog clock run-in signal;

a synchronizing portion for receiving the sliced data from the slicer, wherein the synchronizing portion synchronizes the sliced data with an internal clock signal to produce synchronized sliced data and wherein the internal clock signal has a frequency higher than a frequency of the analog clock run-in signal;

an edge detecting portion for receiving the synchronized sliced data, for detecting rising edges of pulses of the synchronized sliced data, and for outputting an edge detection signal which comprises pulses that respectively correspond to the rising edges;

a clock generator for receiving the edge detection signal from the edge detecting portion and for generating a detection clock signal based on the pulses of the edge detection signal; and a data detecting portion for receiving the synchronized sliced data from the synchronizing portion and the detection clock signal and for detecting the digital data contained in the vertical blanking period by synchronizing the synchronized sliced data according to the detection clock signal.

BRIEF DESCRIPTION OF THE DRAWINGS

The preferred embodiments are described with reference to the drawings wherein:

FIG. 1 is a block diagram of a conventional slicer for obtaining digital data sliced from a television video signal;

FIGS. 2A–2D are waveform diagrams for explaining the operation of the slicer illustrated in FIG. 1;

FIGS. 3A–3E are waveform diagrams for explaining the difference between the case in which the digital data is encoded in an ideal undistorted signal and a case in which the digital data is encoded in distorted signal;

FIGS. 5A–5J are waveform diagrams of signals output from the various components of FIG. 4.

DETAILED DESCRIPTION OF THE PREFERRED EMBODIMENT

Figure 4:
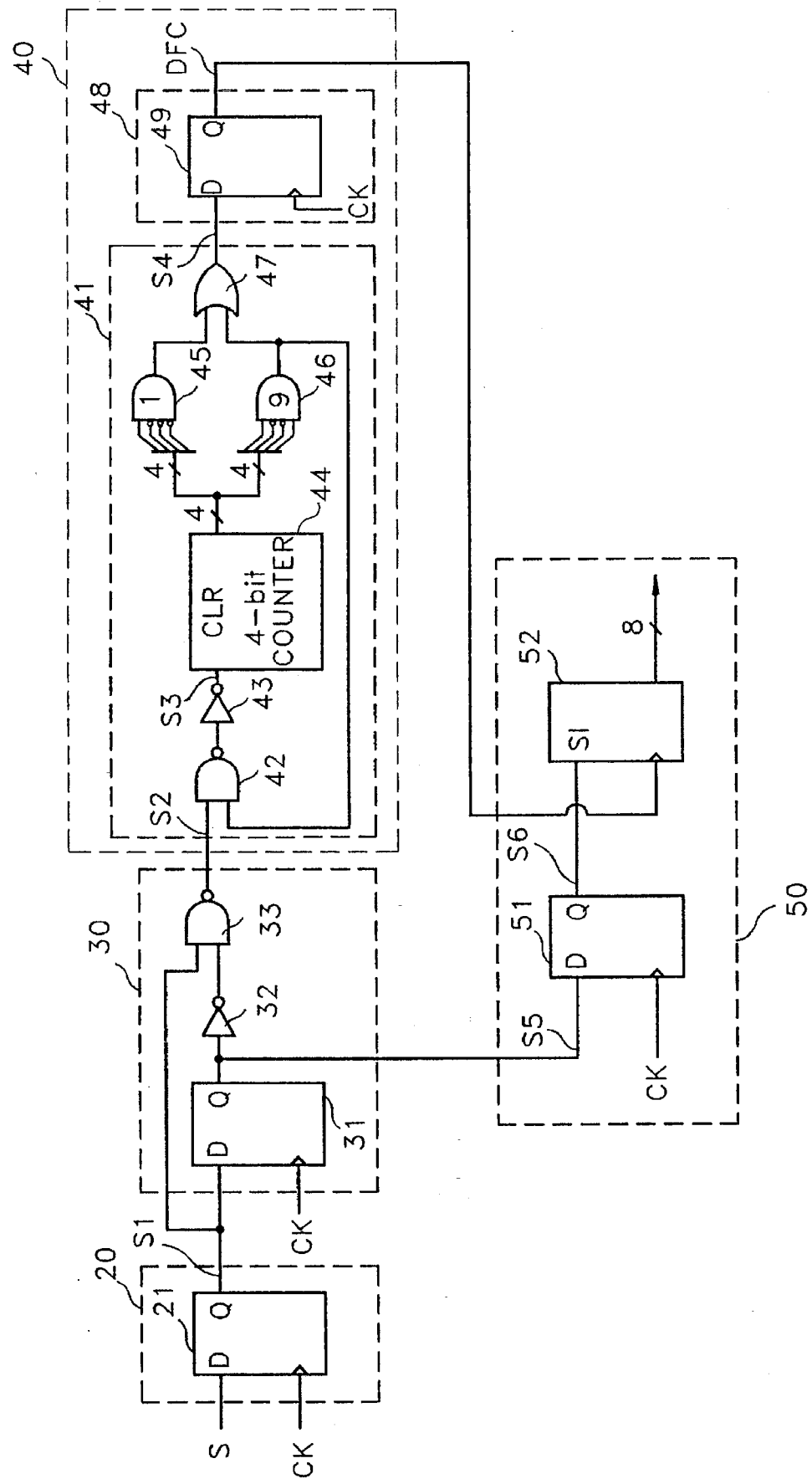
FIG. 4 is a circuit diagram of one embodiment of a digital data detector of the present invention.

As explained above, when a composite video signal is distorted by noise, the duty cycle of the sliced data S produced by the conventional slicer is changed in accordance with the degree of the distortion. However, since the transmitted data has a constant frequency, the received data will also have a constant frequency even if the received data is distorted. Thus, the present invention utilizes such signal characteristics to generate detection clocks for precisely detecting the digital data contained within the vertical blanking period.

As mentioned above, the CRI signal contained in the vertical blanking period of the composite video signal comprises a 16 bit pattern "1010 1010 1010 1010". Therefore, even when the slicer shown in FIG. 1 extracts the CRI signal from a distorted video signal, the sliced data S still has a predetermined frequency. In other words, the time intervals between the rising edges of the data produced according to the distorted analog CRI signal are constant. Similarly, time intervals between the falling edges of the data are also constant.

The circuit illustrated in FIG. 4 relies on the signal characteristics above to precisely detect the digital data. As shown in the figure, the circuit inputs the sliced data S produced from the conventional circuit illustrated in FIG. 1 and adjusts the sliced data S to its proper value based on the constant time intervals between the rising (or falling) edges of the data. One example of the sliced data S which is applied to the apparatus shown in FIG. 4 is illustrated in FIG. 5B. Specifically, the sliced data S is obtained from the analog CRI signal which corresponds to two serial bits "10" of the digital CRI signal. Furthermore, the hatched portion illustrated in FIG. 5B represents the various positions at which the falling edge of the HIGH level pulse of the sliced data S may occur due to the distortion of the received signal.

After receiving the sliced data S, the apparatus shown in FIG. 4 produces a detection clock signal DFC by using an internal clock CK having five times the frequency of the CRI signal. However, the frequency of the internal clock CK is not limited to such value, and an internal clock CK having a different frequency may be used.

As illustrated in FIG. 4, the circuit comprises a synchronizing portion 20, an edge detecting portion 30, a clock generator 40, and a data detecting portion 50. The synchronizing portion 20 inputs the sliced data S output from the conventional slicer as well as the internal clock CK illustrated in FIG. 5A. In the present embodiment, the synchronizing portion 20 simply contains a D flip-flop 21 which receives the sliced data S via its data input port D and receives the internal clock CK via its clock terminal. As a result, the D flip-flop outputs a signal S1 (see FIG. 5C), which is synchronized with the internal clock CK, via its data output port Q.

The edge detecting portion 30 inputs the signal S1 and detects the rising edges of the signal S1. Subsequently, the edge detecting portion 30 generates an edge detection signal S2 (see FIG. 5D) which comprises pulses that are indicative of the rising edges of the signal S1. The edge detecting portion 30 comprises a D flip-flop 31, an inverter 32, and a NAND gate 33. The D flip-flop 31 inputs the signal S1 via its data input port D and receives the internal clock CK via its clock terminal. Consequently, the D flip-flop 31 outputs a signal S5 (see FIG. 5I) by delaying the signal S1 by one clock period of the internal clock CK.

The inverter 32 inputs the signal S5 from the D flip-flop 31 and produces an inverted signal S5. The NAND gate 33 inputs the inverted signal S5 and the undelayed signal S1 from the synchronizing portion 20, performs a NAND operation on such signals, and outputs the edge detection signal S2.

The clock generator 40 comprises a stable region detector 41 and a detection clock outputting circuit 48. The stable region detector 41 comprises a gate circuit 42, an inverter 43, a counter 44, AND gates 45 and 46, and an OR gate 47. The counter 44 and the AND gates 45 and 46 are designed based on the relationship between the frequency of the internal clock CK and the frequency of sliced data S. In the present embodiment, the frequency of internal clock CK is designed to be at least five times the frequency of sliced data S.

The gate circuit 42 inputs the edge detection signal S2 from edge detecting portion 30 and the signal output from the AND gate 46, inverts the signal S2, and performs a NAND operation on such signals. Subsequently, the gate circuit 42 outputs the resultant signal to the inverter 43, and the inverter 43 inverts the resultant signal to generate a signal S3 (see FIG. 5E).

The counter 44 inputs the signal S3 via its clear terminal CLR and the internal clock CK via a count terminal. Accordingly, the counter 44 continuously counts the internal clock CK pulses after being cleared by the signal S3. The resultant counted value is output from the counter 44 via the 4 bit output port to the AND gates 45 and 46. The AND gate 45 outputs a "1" when the counted value equals "0001", and the AND gate 46 outputs a "1" when the counted value equals "1001".

The signals output from the AND gates 45 and 46 are respectively input to the input ports of the OR gate 46. The OR gate performs an OR operation on the received signals and outputs the signal S4 (see FIG. 5G). Based on the above configuration, the signal S4 has two pulses which have a time interval that is less than the time interval between two pulses of the edge detection signal S2. Specifically, the time interval between the two pulses of the signal S4 is smaller than the interval between the two pulses of the signal S2 by one internal clock CK pulse. Please note that the relative time intervals of the signals S2 and S4 are not limited to those described above and that the signals S2 and S4 having different relative time intervals may be used as long as the HIGH level and LOW level of the sliced data S can be precisely detected.

The signal S4 from the stable region detector 41 is input to the detection clock outputting circuit 48. In the present embodiment, the outputting circuit 48 comprises a D flip-flop 49 which delays the signal S4 by one pulse of the internal clock CK. Specifically, the D flip-flop 49 receives the signal S4 via its data input port D and synchronizes the signal S4 with the internal clock CK input via its clock terminal. As a result, the D flip-flop 49 outputs the delayed signal S4 via its data output port Q as the detection clock signal DFC (see FIG. 5H).

The detection clock signal DFC is used to detect the digital data contained in the vertical blanking period of the composite video signal. In particular, the detection clock signal DFC is produced in accordance with the data obtained by slicing the analog CRI signal and is used as a clock signal for detecting the digital data following the CRI signal in the composite video signal.

The data detecting portion 50 comprises a D flip-flop 51 and a serial to parallel converter 52 and inputs the signal S5 output from the D flip-flop 31 of edge detecting portion 30 and the detection clock signal DFC output from the clock generator 40. In particular, the D flip-flop 51 receives the signal S5 via its input port D and receives the internal clock CK via its clock terminal. As a result, the D flip-flop 51 synchronizes the signal S5 in accordance with the internal clock CK, and the synchronized signal is output via an output port Q as a signal S6 (see FIG. 5J).

The serial to parallel converter 52 inputs the signal S6 via its serial input port S1 and inputs the detection clock signal DFC via its clock terminal. Consequently, the serial to parallel converter 52 converts the serial signal S6 into 8 bits of parallel data based on the detection clock signal DFC. In other words, the serial to parallel converter 52 detects the digital data contained in the signal S6 according to the rising edges of the detection clock signal DFC. The detected data is converted from serial data to parallel data and is output as 8 bits of parallel data. As a result, the serial to parallel converter 52 inputs the detection clock signal DFC and detects all of digital data contained in the vertical blanking period of the composite video signal in accordance with the detection clock signal DFC.

In the embodiment illustrated in FIG. 4, the digital data contained in the vertical blanking period is detected based on the data output from the D flip-flop 31 of the edge detecting portion 30. However, one skilled in the art would know that the digital data can be detected from other signals. For example, the digital data may be detected from the signal S1 output from synchronizing portion 20.

As described above, the detection clock generator of the present invention can detect digital data located after the CRI signal by using the detection clock signal DFC obtained by slicing the CRI signal. Thus, since the CRI signal has a constant frequency even if the composite video signal is distorted, the digital data can be precisely detected regardless if the composite video signal contains a ghost or is effected by noise. Accordingly, by using the detection clock signal DFC generated by the detection clock generator 40, the digital data contained in the vertical blanking period of the composite video signal can be accurately detected.

While only certain embodiments of the invention have been specifically described herein, it will apparent that numerous modifications may be made thereto without departing from the spirit and scope of the invention.

What is claimed is:

1. An apparatus for generating a detection clock signal for detecting digital data contained in a vertical blanking period of a received composite video signal based on an analog clock run-in signal which has a constant frequency and which is contained in said vertical blanking period of said received composite video signal, said apparatus comprising:

a slicer for generating a slicing reference signal based on said analog clock run-in signal, for slicing said analog clock run-in signal by using said slicing reference signal, and for outputting sliced data according to said slicing of said analog clock run-in signal;

a synchronizing portion for receiving said sliced data from said slicer, wherein said synchronizing portion synchronizes said sliced data with an internal clock signal to produce synchronized sliced data and wherein said internal clock signal has a frequency higher than a frequency of said analog clock run-in signal;

an edge detecting portion for receiving said synchronized sliced data, for detecting rising edges of pulses of said synchronized sliced data, and for outputting an edge detection signal which comprises pulses that respectively correspond to said rising edges; and a clock generator for receiving said edge detection signal from said edge detecting portion and for generating a detection clock signal based on said pulses of said edge detection signal.

2. The detection clock generator as claimed in claim 1, wherein said synchronizing portion comprises:

a first flip-flop having a first input port and a first output port, wherein said first flip-flop inputs said sliced data from said slicer via said first input port, synchronizes said sliced data with said internal clock signal to produce said synchronized sliced data, and outputs said synchronized sliced data via said first output port.

3. The detection clock generator as claimed in claim 1, wherein said edge detecting portion comprises:

a second flip-flop having a second input port and a second output port, wherein said second flip-flop receives said synchronized sliced data output from said synchronizing portion via said second input port, synchronizes said synchronized sliced data with said internal clock signal to produce a first output signal, and outputs said first output signal via said second output port;

a first inverter for inverting said first output signal output from said second flip-flop to produce an inverted first output signal; and a first NAND gate for performing a NAND operation on said inverted first output signal from said first inverter and said synchronized sliced data from said synchronizing portion to produce said edge detection signal.

4. The detection clock generator as claimed in claim 1, wherein said clock generator comprises:

a stable region detector, wherein said stable region detector determines two data detection points, wherein a time interval between said two data detection points is smaller than a time interval between two pulses of said edge detection signal and wherein said stable region detector generates an intermediate clock signal comprising clock pulses which correspond to said two data detection points.

5. The detection clock generator as claimed in claim 4, wherein said stable region detector comprises:

a first gate circuit for receiving said edge detection signal from said edge detecting portion via a first gate input port, inverting said edge detection signal to produce an inverted edge detection signal, and performing a NAND operation on said inverted edge detection signal and a feedback signal received via a second gate input port to produce a second output signal;

a second inverter for inverting said second output signal to produce an inverted second output signal;

a counter, wherein said counter counts clock pulses of said internal clock signal to produce a counted value and wherein said inverted second output signal resets said counted value to a predetermined value;

a second gate circuit for receiving said counted value from said counter and outputting a third output signal, wherein said third output signal equals a logic value "1" when said counted value equals "1";

a third gate circuit for receiving said counted value from said counter and outputting said feedback signal to said second gate input port of said first gate circuit, wherein said feedback signal equals a logic value "1" when said counted value equals "9"; and an OR gate for logically summing said third output signal and said feedback signal to produce said intermediate clock signal.

6. The detection clock generator as claimed in claim 5, wherein said clock generator further comprises:

a detection clock outputting circuit, wherein said detection clock outputting circuit inputs said intermediate clock signal from said OR gate and outputs said detection clock signal based on said intermediate clock signal.

7. An apparatus for detecting digital data contained in a vertical blanking period of a received composite video signal based on an analog clock run-in signal which has a constant frequency and which is contained in said vertical blanking period of said received composite video signal, said apparatus comprising:

a slicer for generating a slicing reference signal based on said analog clock run-in signal, for slicing said analog clock run-in signal and subsequently slicing a digitally encoded signal by using said slicing reference signal, and for outputting sliced data according to said slicing of said analog clock run-in signal;

a synchronizing portion for receiving said sliced data from said slicer, wherein said synchronizing portion synchronizes said sliced data with an internal clock signal to produce synchronized sliced data and wherein said internal clock signal has a frequency higher than a frequency of said analog clock run-in signal;

an edge detecting portion for receiving said synchronized sliced data, for detecting rising edges of pulses of said synchronized sliced data, and for outputting an edge detection signal which comprises pulses that respectively correspond to said rising edges;

a clock generator for receiving said edge detection signal from said edge detecting portion and for generating a detection clock signal based on said pulses of said edge detection signal; and a data detecting portion for receiving said synchronized sliced data from said synchronizing portion and said detection clock signal and for detecting said digital data contained in said vertical blanking period by synchronizing said synchronized sliced data according to said detection clock signal.

8. The detection clock generator as claimed in claim 4, wherein said time interval between said two data detection points is smaller than said time interval between said two pulses of said edge detection signal by a time interval of one pulse of said internal clock signal.

9. The detection clock generator as claimed in claim 6, wherein said detection clock outputting circuit comprises:

a third flip-flop, wherein said third flip-flop inputs said intermediate clock signal and said internal clock signal and delays said intermediate clock signal by one period of said internal clock signal to produce said detection clock signal.

10. An apparatus for detecting digital data contained in a vertical blanking period of a received composite video signal based on an analog clock run-in signal which has a constant frequency and which is contained in said vertical blanking period of said received composite video signal, said apparatus comprising:

a slicer for generating a slicing reference signal based on said analog clock run-in signal, for slicing said analog clock run-in signal by using said slicing reference signal, and for outputting sliced data according to said slicing of said analog clock run-in signal;

a synchronizing portion for receiving said sliced data from said slicer, wherein said synchronizing portion synchronizes said sliced data with an internal clock signal to produce synchronized sliced data and wherein said internal clock signal has a frequency higher than a frequency of said analog clock run-in signal;

an edge detecting portion for receiving said synchronized sliced data, for producing a first output signal based on said synchronized sliced data, for detecting rising edges of pulses of said synchronized sliced data, and for outputting an edge detection signal which comprises pulses that respectively correspond to said rising edges;

a clock generator for receiving said edge detection signal from said edge detecting portion and for generating a detection clock signal based on said pulses of said edge detection signal; and a data detecting portion for receiving said detection clock signal and at least one of said synchronized sliced data from said synchronizing portion and said first output signal from said edge detecting portion and for detecting said digital data contained in said vertical blanking period by synchronizing said at least one of said synchronized sliced data and said first output signal according to said detection clock signal.

11. The apparatus for detecting digital data according to claim 10, wherein said edge detecting portion comprises:

a first flip-flop having a first input port and a first output port, wherein said first flip-flop receives said synchronized sliced data output from said synchronizing portion via said first input port, synchronizes said synchronized sliced data with said internal clock signal to produce said first output signal, and outputs said first output signal via said first output port;

a first inverter for inverting said first output signal output from said first flip-flop to produce an inverted first output signal; and a first NAND gate for performing a NAND operation on said inverted first output signal from said first inverter and said synchronized sliced data from said synchronizing portion to produce said edge detection signal.

12. The apparatus for detecting digital data according to claim 11, wherein said clock generator comprises:

a stable region detector, wherein said stable region detector determines two data detection points, wherein a time interval between said two data detection points is smaller than a time interval between two pulses of said edge detection signal and wherein said stable region detector generates an intermediate clock signal comprising clock pulses which correspond to said two data detection points.

13. The apparatus for detecting digital data according to claim 12, wherein said clock generator further comprises:

a detection clock outputting circuit, wherein said detection clock outputting circuit inputs said intermediate clock signal from said stable region detector and outputs said detection clock signal based on said intermediate clock signal.

14. The apparatus for detecting digital data according to claim 13, wherein said synchronizing portion comprises:

a second flip-flop having a second input port and a second output port, wherein said second flip-flop inputs said sliced data from said slicer via said second input port, synchronizes said sliced data with said internal clock signal to produce said synchronized sliced data, outputs said synchronized sliced data via said second output port.

15. The detection clock generator as claimed in claim 14, wherein said stable region detector comprises:

a first gate circuit for receiving said edge detection signal from said edge detecting portion via a first gate input port, inverting said edge detection signal to produce an inverted edge detection signal, and performing a NAND operation on said inverted edge detection signal and a feedback signal received via a second gate input port to produce a second output signal;

a second inverter for inverting said second output signal to produce an inverted second output signal;

a counter, wherein said counter counts clock pulses of said internal clock signal to produce a counted value and wherein said inverted second output signal resets said counted value to a predetermined value;

a second gate circuit for receiving said counted value from said counter and outputting a third output signal, wherein said third output signal equals a logic value "1" when said counted value equals "1";

a third gate circuit for receiving said counted value from said counter and outputting said feedback signal to said second gate input port of said first gate circuit, wherein said feedback signal equals a logic value "1" when said counted value equals "9"; and an OR gate for logically summing said third output signal and said feedback signal to produce said intermediate clock signal.

16. The apparatus for detecting digital data according to claim 15, wherein said data detecting portion comprises:

a third flip-flop having a third input port and a third output port, wherein said third input port receives one of said synchronized sliced data from said synchronizing portion and said first output signal from said edge detecting portion, wherein said third flip-flop synchronizes said one of said synchronized sliced data and said first output signal in accordance with said internal clock signal to produce a fourth output signal, and wherein said third flip-flop outputs said fourth output signal via said third output port; and a serial to parallel converter having a serial input terminal, a count clock terminal, and a parallel output terminal, wherein said serial to parallel converter inputs said fourth output signal via said serial input terminal and said detection clock signal via said count clock terminal and wherein said serial to parallel converter converts said fourth output signal into parallel data based on said detection clock signal and outputs said parallel data via said parallel output terminal as said digital data.

17. The detection clock generator as claimed in claim 12, wherein said time interval between said two data detection points is smaller than said time interval between said two pulses of said edge detection signal by a time interval of one pulse of said internal clock signal.

18. The detection clock generator as claimed in claim 13, wherein said detection clock outputting circuit comprises:

a fourth flip-flop, wherein said fourth flip-flop inputs said intermediate clock signal and said internal clock signal and delays said intermediate clock signal by one period of said internal clock signal to produce said detection clock signal.

19. The apparatus for detecting digital data according to claim 16, wherein said third input port of said third flip-flop inputs said synchronized sliced data from said synchronizing portion.

20. The apparatus for detecting digital data according to claim 16, wherein said third input port of said third flip-flop inputs said first output signal from said edge detecting portion.

* * * * *